July 8, 1924.  
A. GIUFRI  
FOOT PROPELLED VEHICLE  
Filed Dec. 29, 1922  
1,500,809  
3 Sheets-Sheet 1

Inventor  
Antony Giufri  
By T. Clay Lindsey  
His Attorney

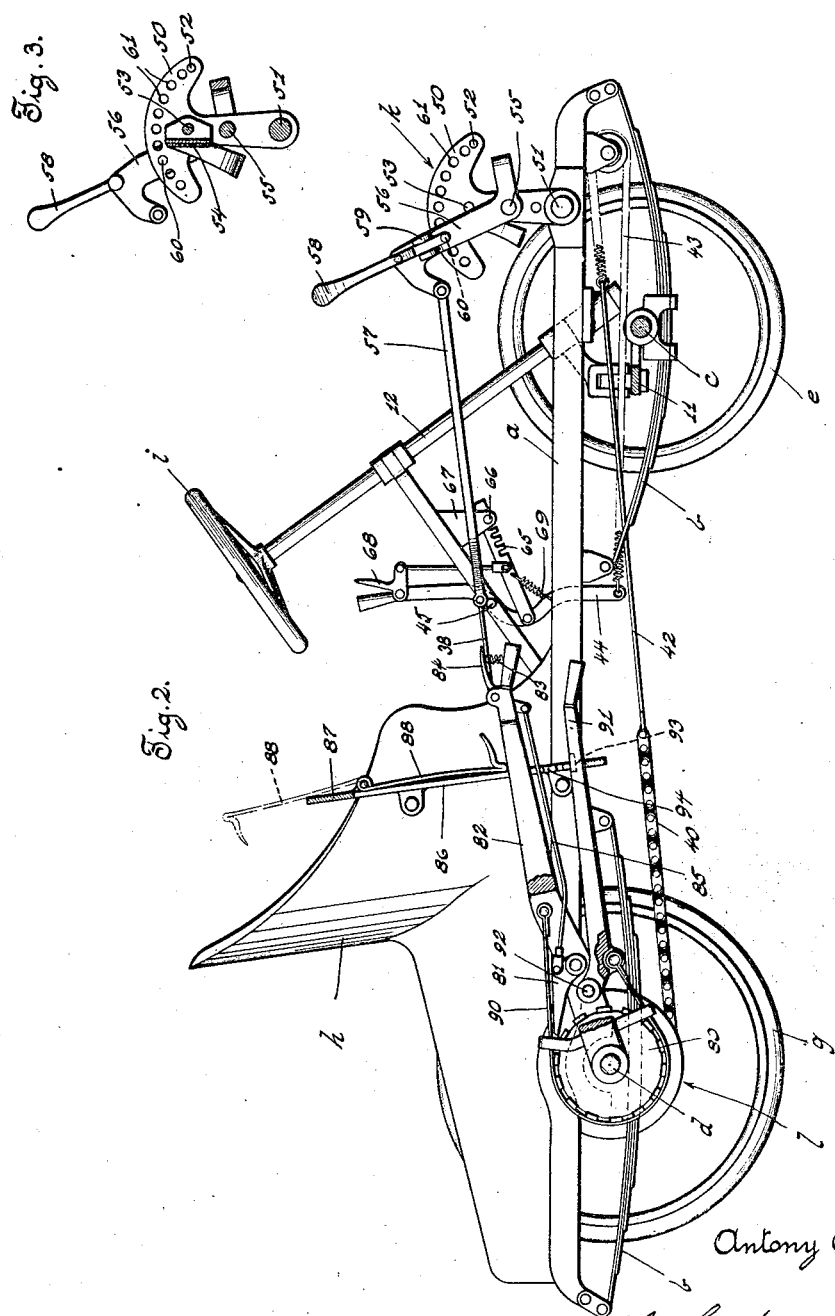

July 8, 1924.
A. GIUFRI
1,500,809
FOOT PROPELLED VEHICLE
Filed Dec. 29, 1922
3 Sheets-Sheet 3
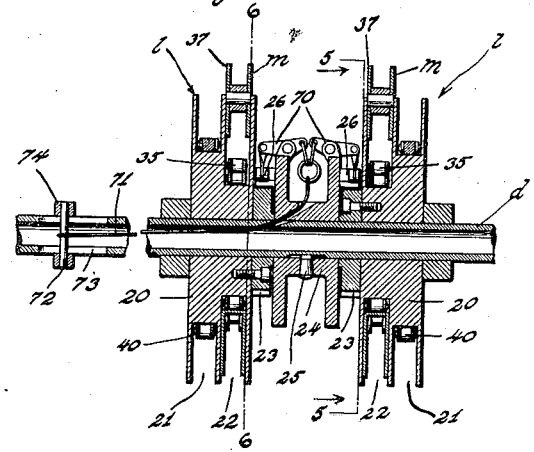
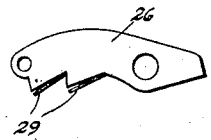
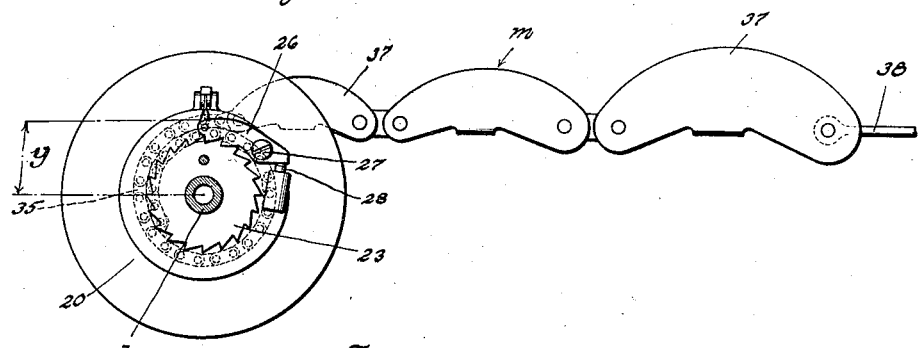
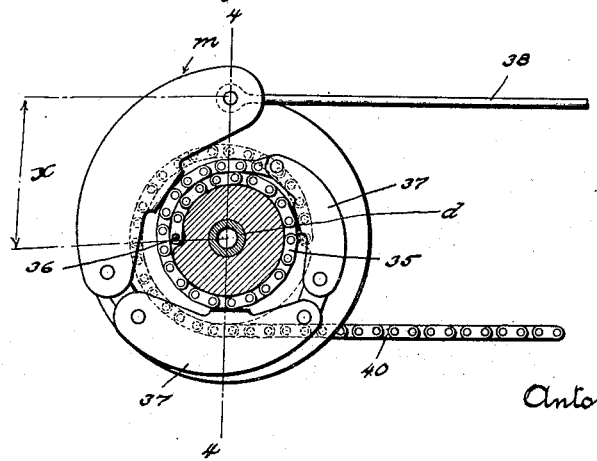
Inventor
Antony Giufri
By T. Clay Lindsey
His Attorney Patented July 8, 1924.

1,500,809

UNITED STATES PATENT OFFICE.

ANTONY GIUFRI, OF HARTFORD, CONNECTICUT.

FOOT-PROPELLED VEHICLE.

Application filed December 29, 1922. Serial No. 609,620.

*To all whom it may concern:*

Be it known that I, ANTONY GIUFRI, a subject of the King of Italy, and a resident of Hartford, county of Hartford, State of Connecticut, have invented certain new and useful Improvements in Foot-Propelled Vehicles, of which the following is a specification.

The present invention relates to foot propelled vehicles, and has as its object to provide a vehicle of this sort having various features of novelty and advantage. More particularly, my improved vehicle is characterized by its simplicity in construction and the ease with which it may be operated and controlled.

In the accompanying drawings, wherein I have shown, for illustrative purposes, one embodiment which the present invention may take, Fig. 1 is a top plan view of my improved vehicle;

Fig. 2 is a side view thereof;

Fig. 3 is a central sectional view of one of the operating levers or pedals;

Fig. 4 is a sectional view taken vertically and centrally through the driving mechanism mounted on the rear axle, this view being taken on a plane indicated by the line 4—4 of Fig. 6;

Fig. 5 is a view taken on line 5—5 of Fig. 4 and looking in the direction of the arrows;

Fig. 6 is a sectional view taken on line 6—6 of Fig. 4;

Fig. 7 is a side view of one of the pawls of the driving mechanism.

Figure 1:
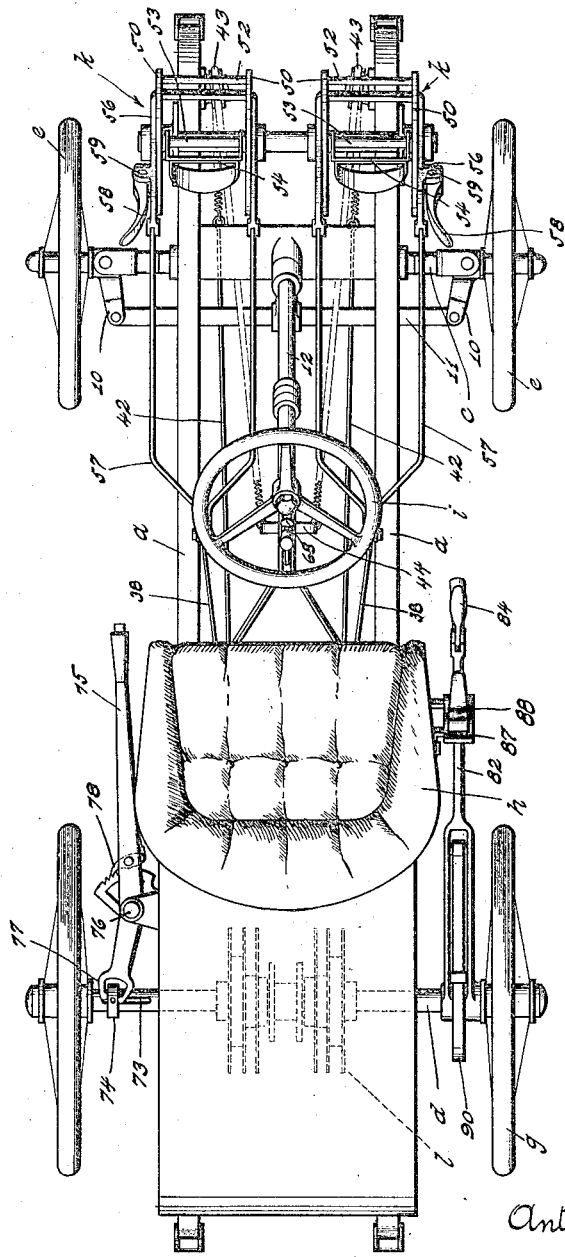

Referring to the drawings in detail, $a$ denotes the frame of any suitable construction supported by springs $b$ on the front and rear axles $c$, $d$, respectively. $e$, $e$ designate the wheels of the front pair, and $g$, $q$, the rear wheels. Provided on the frame is conveniently positioned a seat $h$ forwardly of which is mounted the steering wheel $i$ and a pair of propelling devices $k$, $k$; in the present illustrative disclosure, these devices being in the form of pedals adapted to be oscillated by the feet of the operator. On the rear axle $d$ are the driving devices $l$, $l$, of similar construction and respectively connected to the foot pedals by driving chains $m$, $m$, One of the rear wheels, in the present instance the left hand one, is fixed to the rotatable shaft $d$, and the other rear wheel is loose on this shaft so as to accommodate turning movement of the vehicle about a corner. The front wheels $e$ are carried by knuckles 10 connected by a rod 11 to the steering post 12 in any suitable manner.

Each of the driving devices $l$ includes a hub 20 having a pair of grooves 21, 22 in its periphery. Secured to the opposed faces of the hubs 20 are the ratchet wheels 23 between which is interposed a sleeve 24 fixed as by means of a key 25 to the rear axle $d$ so as to rotate therewith. The hubs 20 are normally loose on the shaft so as to be rotated independently thereof. Pivoted to the opposite faces of the sleeve 24 are the pawls 26 associated with the respective ratchet wheels 23. Each of these pawls is pivoted to the sleeve as by means of a screw 27 and are urged into engagement with the respective ratchet wheels by spring pressed plungers 28. Preferably, the faces of the teeth on these pawls are provided with springs 29 (see Fig. 7) which serve to ease the pawls into engagement with the teeth and thereby eliminate, or at least greatly reduce, the chattering which would otherwise result. Each of the driving chains includes a small link portion 35, one end of which is connected to the hub as at 36, and a large link portion having links 37 increasing in size, as shown most clearly in Figs. 6 and 7. The end of the larger link 37 is connected by a rod 38 to the proper foot pedal, as hereinafter described. It will be seen, particularly from Figs. 4, 5 and 6, that each of the driving chains is wrapped about itself in a series of convolutions within the groove 22 of the hub 20. As hereinafter described more in detail, the foot pedals are adjustable so as to vary the extent to which the driving chains are wrapped about their respective hubs so as to vary the power of the vehicle.

Wrapped about the hubs in a direction opposite to that of the driving chains, and guided by the flanges of the groove 21, are the chains 40. The forward ends of these chains are connected by rods 42 and springs 43 to the lower end of the lever 44 pivoted to the brace for the steering rod as at 45 immediately in front of the seat $h$. It will be seen that the springs 43 tend to draw the chains 40 in the direction to cause them to be unwrapped from the hubs and thereby rotate these hubs in a direction opposite to that which they are rotated by the driving chains m.

Each of the pedal devices comprises a pair of T-shaped members or quadrants 50 pivoted to the frame as at 51 and connected together by a cross rod 52. Pivoted on the pin 53 and having its ends anchored in the quadrants is a stirrup 54 adapted to receive the foot of the operator, as shown most clearly in Fig. 3. Pivoted to the quadrants 50 as at 55 is a U-shaped lever 56, the ends of which are connected by a fork 57 to the driving chains m. The lever 56 may be adjusted angularly with respect to the quadrant 50 by means of a handle 58 pivoted to the lever 56 as at 59 and having at its lower end a pin 60 adapted to fit in notches or holes 61 in the quadrant 50.

The lever 44 to which the retracting chains 40 are connected by means of the spring 43 is held in any one of a number of predetermined angular positions of adjustment by means of a rack bar 65, the notches of which are adapted to receive a stop or pin 66 carried by a lug 67 depending from the brace for the steering rod. The rack bar 65 may be raised out of engagement with the pin 66 in any suitable manner as by means of a pivoted hand grip 68. The rack is normally urged into locking relation to the pin 66 by means of a spring 69.

It will be understood with the arrangement so far described that when the operator, sitting in the seat h, wishes to propel the device, he will alternately advance the pedals, and then allow them to be retracted. When the pedals are pushed forwardly, the respective hubs will be rotated by the driving chains in a direction to rotate, through the ratchet wheels and the pawls 26 and the sleeve 24, the rear axle to drive the vehicle forwardly. The springs 43, acting through the retracting chains 40, will cause the driving chains to be re-wrapped upon the hubs and retract the pedals when pressure is relieved from the latter. It is of importance to note that the driving chains are wrapped upon themselves in superimposed convolutions, and the extent to which they are so wrapped may be adjusted by angularly adjusting the levers 56. When the levers 56 are angularly adjusted relative to the quadrants 50 back towards the operator, the driving chains will be wrapped to a greater extent about the hubs, as shown most clearly in Fig. 6. It will be understood that the power arm, the length of which is indicated by the line x in Fig. 6, is greater than the power arm, the length of which is indicated by the line y in Fig. 5, and, therefore, a greater amount of power will be obtained when the lever 56 is in the position shown in Fig. 2 than would be the case if it were secured to the forward end of the quadrant 50. The upper end of the lever 44 will be thrown forwardly and locked in this position so that the retracting springs 43 will exert the proper tension. When the driving chain is in the position shown in Fig. 6, a maximum amount of power is obtained which will be of advantage when propelling the vehicle up a grade or over heavy roads. When it is desired to drive the vehicle over a flat, even road, in which case greater speed will be desired, the levers 56 will be adjusted forwardly relative to the quadrants 50 so as to partially unwrap the chain, as shown in Fig. 5. In this case, the lever 44 will be rocked back towards the operator in order that the retracting springs do not exert too great a tension. It is true that the quadrant 50, during the propulsion of the vehicle, is capable of movement through the same angle of rotation irrespective as to whether the chain m is attached to the rear or front of the quadrant. However, in any one position of the quadrant, a greater length of chain is wrapped upon the drum 20 when the chain is connected to the rear of the quadrant, than when it is connected to the front end thereof. Assuming that the quadrant is in its rearmost position, and the lever 56 is in the position shown in Fig. 2, a greater amount of chain will be wrapped about the drum than would be the case if the lever 56 were thrown forwardly relative to the quadrant with the pin 60 engaging in the foremost hole 52 in the quadrant. It may further be assumed that when the quadrant and lever 56 are in their rearmost positions, the chain is wrapped about the hub, as shown in Fig. 6. If, now, without changing the position of the quadrant, the lever 56 is thrown forwardly, the chain will be brought to the position shown in Fig. 5. When the chain is in the position shown in Fig. 6, a greater amount of power is obtained.

Means are provided on the rear axle for turning this axle in a direction to propel the vehicle backwardly independently of the foot pedals. In this instance, it is preferable to disconnect the driving devices from the rear axle and to this end the pawls are connected to levers 70 (see Fig. 4) pivoted to the sleeve 24 and having their inner or adjacent arms connected by a flexible wire 71 or the like to a pin 72 operating in a slot 73 in the rear axle and carried by a sleeve 74 slidably mounted on this axle. The sleeve may be moved longitudinally of the axle d in any suitable manner as, for instance, by means of a lever 75 pivoted as at 76 to the frame and having a bifurcated end or yoke 77 straddling the sleeve 74. The lever 75 may be held in any position of adjustment by the cooperating pawl or rack 78, as shown most clearly in Fig. 1.

For the purpose of propelling the vehicle backwardly, there is provided on the rear axle d a drum 80 having teeth in its periphery with which cooperate a pawl 81 pivoted to a hand lever 82 which is suitably journalled on the shaft $d$. The pawl 81 is normally urged out of engagement with the drum 80 by a spring 83 acting through a lever 84 connected to the pawl by a rod 85. It will be seen that when it is desired to back the vehicle, this may be done by gripping the hand lever 82 thereby compressing the spring 83 and moving the pawl 81 into engagement with the teeth of the drum and then oscillating the lever 82, the pawl and drum acting in the nature of a ratchet. The lever 82 works in a slot 86 in a suitable guide member 87 fixed to the side of the vehicle. For the purpose of holding the lever 82 in the position shown in Fig. 2, the pivoted latch 88 is provided. This latch is shown by full lines in operative position and in dotted lines in inoperative position. For the purpose of breaking the speed of the vehicle, a brake band 90, passing about the drum 80, is provided. One end of this band is connected to the reversing lever 82 and the other end to a brake lever 91. This brake lever is pivoted, as at 92, to the reversing lever. The brake lever has, adjacent its free end, a rib or dog 93 adapted to cooperate with teeth 94 on the member 87 for holding the brake lever in any desired position of adjustment. The brake lever is sufficiently resilient to permit it to be sprung laterally to disengage the dog 93 from one tooth and then engage it with another one.

I claim as my invention:—

1. In a foot propelled vehicle, the combination with a frame, an axle journalled therein, and wheels thereon, a drive chain for said axle wrapped upon itself, and means for varying the extent to which said chain is wrapped about itself to thereby vary the turning power thereof.

2. In a foot propelled vehicle, the combination with a frame, an axle journalled therein, and wheels thereon, a drive chain for said axle wrapped upon itself in superimposed convolutions, a foot operated device, and an adjustable connection between said device and chain for varying the extent to which said chain is wrapped upon itself to thereby vary the power.

3. In a foot propelled vehicle, the combination with a frame, an axle journalled therein, and wheels thereon, of driving means including a member adapted for free rotation on said axle in one direction and fixed against relative rotation in the opposite direction, a drive chain fixed to said member and wrapped in superimposed convolutions thereabout, and means for alternately unwrapping and wrapping said chain on said member.

4. In a foot propelled vehicle, the combination with a frame, an axle journalled therein, and wheels on said axle, of a drive chain for said axle wrapped upon itself and including links increasing in size, and means for varying the extent to which said chain is wrapped about itself to thereby vary the turning power thereof.

5. In a foot propelled vehicle, the combination with a frame, an axle journalled therein, and wheels on said axle, of a drive chain for said axle wrapped upon itself in successive convolutions and including a portion having small links and an end portion having large links varying in size, and means for varying the extent to which said chain is wrapped about itself to thereby vary the power.

6. In a foot propelled vehicle, the combination with a frame, an axle journalled therein, and wheels on said axle, of a hub journalled on said axle, a ratchet between said hub and axle, a chain secured to said hub and wrapped about itself in superimposed convolutions, a foot pedal pivoted to said frame, and an adjustable connection between said pedal and chain for varying the extent to which the latter is wrapped about itself.

7. In a foot propelled vehicle, the combination with a frame, an axle journalled therein, and wheels on said axle, of a drive chain for said axle and wrapped upon itself in superimposed convolutions, a foot pedal pivoted to said frame, a lever pivoted to said pedal, means for locking said lever in any one of a plurality of angular positions relative to said pedal, and a connection between said lever and chain.

8. In a foot propelled vehicle, the combination with a frame, an axle journalled therein, and wheels on said axle, of a drive chain on said axle wrapped about itself in superimposed convolutions, a pedal pivoted to said frame and having a quadrant provided with circularly arranged holes, a lever pivoted to said pedal, a pin carried by said lever adapted for engagement in said holes, and a connection between said lever and drive chain.

9. In a foot propelled vehicle, the combination with a frame, an axle journalled therein, and wheels on said axle, of a pair of foot pedals, a driving chain between each pedal and said axle, each of said driving chains being wrapped about itself in superimposed convolutions, and means connected to said pedals for varying the extent to which said chains are wrapped about themselves.

10. In a foot propelled vehicle, the combination of a frame, an axle journalled therein, and wheels on said axle, of a pair of hubs loose on said axle, a ratchet wheel connected to each hub, a sleeve between said ratchet wheels, pawls pivoted to said sleeve and cooperating with the respective ratchet wheels, a pair of pedals pivoted to said frame, and driving chains between said pedals and hubs.

11. In a foot propelled vehicle, the combination with a frame, an axle journalled therein, and wheels on said axle, of a drive chain for said axle wrapped upon itself in superimposed convolutions, a pedal, an adjustable connection between said pedal and chain whereby to vary the extent to which said chain is wrapped about itself, and means for winding said chain upon itself, said last mentioned means being adjustable.

12. In a foot propelled vehicle, the combination with a frame, an axle journalled therein, and wheels on said axle, of a drum loose on said axle, means for preventing relative rotation in one direction between the axle and the hub, a drive chain wrapped about said hub and in superimposed convolutions, a foot pedal, and an adjustable connection between said pedal and drive chain, a second chain wrapped about said hub in the opposite direction, a spring connected to said second mentioned chain, and means for varying the tension of said spring.

13. In a foot propelled vehicle, the combination with a frame, an axle journalled thereon, and wheels on said axle, of a pair of hubs loose on said axle, means for preventing relative rotation between said hubs and axle in one direction, a drive chain wrapped about each hub in superimposed convolutions, a pair of pedals, adjustable connections between the pedals and the respective drive chains, a chain wrapped about each of said hubs in a direction opposite to said drive chains, a lever pivoted to said frame, springs between said last mentioned chains and said lever, and means for locking said lever in any one of a plurality of predetermined positions.

14. In a foot propelled vehicle, the combination with a frame, an axle journalled therein, and wheels on said axle, of a drive mechanism including a ratchet wheel loose on said axle, a sleeve fixed to said axle, a pawl pivoted on said sleeve, said pawl having a plurality of teeth and spring members on each of its teeth, and means for rotating said ratchet wheel in a direction to rotate said axle through said pawl.

15. In a foot propelled vehicle, the combination with a frame, an axle journalled therein, and wheels on said axle, of driving mechanism on said axle including a ratchet wheel and its cooperating pawl, reversing means carried by said rear axle for rotating the same to back the vehicle, and means for disconnecting said pawl from said ratchet wheel to permit of operation of said reversing means.

16. In a foot propelled vehicle, the combination with a frame, an axle journalled therein, and wheels on said axle, of driving means for said axle including a pair of pivoted pawls, reversing means on said axle including a ratchet mechanism, and means for disconnecting said pawls to permit of operation of said reversing means.

17. In a foot propelled vehicle, the combination with a frame and a hollow axle journalled therein; of driving means for said axle including a hub having a ratchet wheel loose on said axle, a sleeve fixed to said axle and a pawl pivoted on said sleeve and cooperating with said ratchet wheel; a slidable sleeve on said axle, a connecting member within said axle and between said sliding sleeve and pawl for disconnecting the latter from said ratchet wheel, means for sliding said sleeve, and means for rotating said axle in a direction to propel the vehicle backwardly.

18. In a foot propelled vehicle, the combination with a frame, an axle journalled therein, and wheels on said axle, of means for rotating said axle in a direction to propel said vehicle forwardly, a drum on said axle, and means cooperating with said drum for driving said vehicle rearwardly.

ANTONY GIUFRI.